E. H. PORTER.
DYNAMO ELECTRIC MACHINE AND MEANS FOR COOLING SAME.
APPLICATION FILED OCT. 22, 1913.
1,145,612.
Patented July 6, 1915.
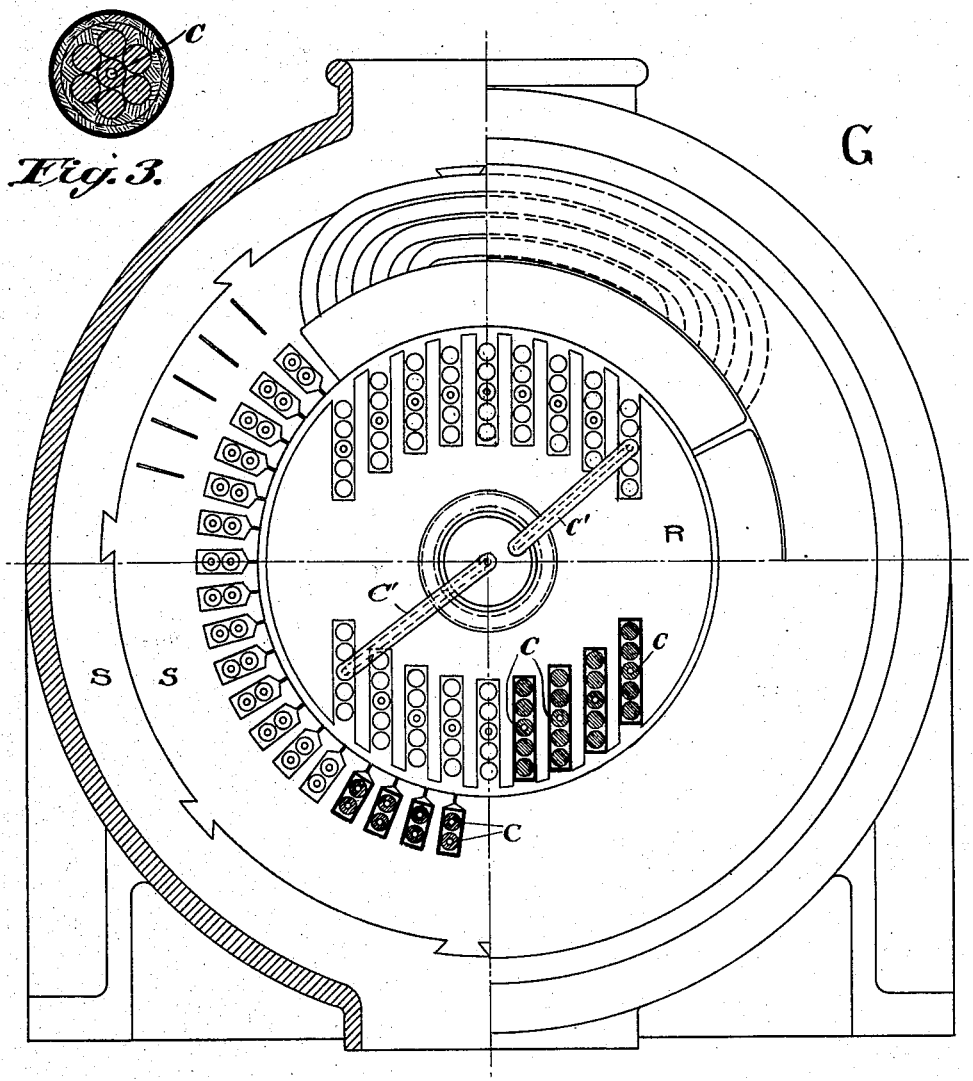
Fig. 3.
Fig. 1.
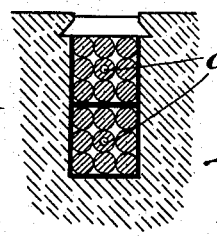
Fig. 2.
Witnesses
Inventor
Edwin H. Porter

UNITED STATES PATENT OFFICE.

EDWIN H. PORTER, OF PHILADELPHIA, PENNSYLVANIA.

DYNAMO-ELECTRIC MACHINE AND MEANS FOR COOLING SAME.

1,145,612. Specification of Letters Patent. Patented July 6, 1915.

Application filed October 22, 1913. Serial No. 796,727.

*To all whom it may concern:*

Be it known that I, EDWIN H. PORTER, citizen of the United States, residing at the city of Philadelphia, in the county of Philadelphia and State of Pennsylvania, have invented certain new and useful Improvements in Dynamo-Electric Machines and Means for Cooling Same, of which the following is a specification.

My invention relates to electric generators and more particularly to alternating current generators of the revolving field type and rotary transformers having an alternating current winding.

The object of my invention is the cooling of such generators and consists specifically in a means of cooling or removing the heat from the electric conductors and cores of the generator.

Various methods of removing the heat by means of circulating air through the slots in the core and through spaces between the core and windings are used in the art.

My invention consists in forming a winding of seamless drawn copper tubing through the magnetic cores of the generator, and circulating a cooling medium of high specific heat and density such as oil water or mercury, through such winding through the interior of the conductor by means of suitable pressure, thus withdrawing and radiating the heat external to the machine itself.

I am aware that in stationary transformers of large size carrying currents of high amperages in their secondary coils, these coils have been constructed of a flattened copper tube of large bore and cross section and water circulated through same for cooling same so I claim nothing new as to cooling a conductor by forcing water through it.

Recent developments in the size of high speed turbine generators and rotary transformers make it commercially desirable to provide some means for removing the heat from the interior of the coils. My invention provides a means for cooling the coils interiorly even where very small wires are used and where they are constructed as "formed" coils.

In the drawings, Figure 1, is an end elevation, partly in section, of a dynamo electric machine having coils embodying my invention; Fig. 2, is an enlarged sectional view showing a combination of solid and hollow wires assembled in a slot of a machine according to my invention; and Fig. 3, is a cross-section of a compound conductor or cable built up of a plurality of solid conductors and a hollow conductor in accordance with my invention.

For the purpose of illustrating embodiments of my invention I have shown in Fig. 1, a conventional illustration of a dynamo electric machine G in which the coils or windings on the stator S and rotor R include one or more hollow conductors C, which may be connected in any suitable manner with a source of cooling liquid having means for circulating the liquid therethrough. I have shown the hollow conductors of the rotor terminating in hollow leads C', which may extend in alinement with the rotor axis and connect in any suitable manner with the supply and exhaust pipes of the liquid supply.

I believe I am the first to provide a means for abstracting the heat from the interior of symmetrically formed coils. As previously stated, the coils may be constructed upon "formers" in the usual manner. The advantage of cooling the coil-structure at the interior and abstracting the heat at the center of the convolutions will be especially appreciated by engineers.

Having duly described my invention and the application of same what I claim as new and original, and wish to protect by Letters Patent of the United States is set forth in the following:—

1. A winding for electrical devices, comprising a coil having the conductors symmetrically arranged, the conductor at the interior of the coil having a symmetrical relation to the other conductors being hollow and adapted to be connected to a fluid supply, whereby a cooling fluid may be circulated therethrough to abstract heat from the interior of the coil.

2. A dynamo electric machine, comprising rotor and stator members provided with windings consisting of coils having hollow conductors at the interior thereof adapted to be connected to a fluid supply, the conductors of the coils being symmetrically arranged with respect to the hollow conductor, whereby a cooling fluid may be circulated through the interior of the coil to abstract the heat therefrom.

3. In windings for electrical devices, a plurality of conductors arranged in a group, at least one of the conductors in the interior of said group being hollow and adapted to be connected to a fluid supply, whereby a cooling fluid may be circulated therethrough to abstract heat from said conductors.

In testimony whereof I affix my signature in presence of two witnesses.

EDWIN H. PORTER.

Witnesses:
R. B. ROBERTS,
EDNA HICKS.

Copies of this patent may be obtained for five cents each, by addressing the "Commissioner of Patents, Washington, D. C."